(12) United States Patent
Takeda

(10) Patent No.: US 8,001,369 B2
(45) Date of Patent: Aug. 16, 2011

(54) INFORMATION PROCESSING UNIT FOR AUTOMATICALLY COPYING SYSTEM INFORMATION

(75) Inventor: Kengo Takeda, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 615 days.

(21) Appl. No.: 12/128,349

(22) Filed: May 28, 2008

(65) Prior Publication Data

US 2009/0006836 A1    Jan. 1, 2009

(30) Foreign Application Priority Data

Jun. 26, 2007   (JP) .................................. 2007-167900

(51) Int. Cl.
*G06F 15/177*   (2006.01)
(52) U.S. Cl. ............................................... 713/2; 713/1
(58) Field of Classification Search ................... 713/1, 2
See application file for complete search history.

(56) References Cited

U.S. PATENT DOCUMENTS

| | | | | |
|---|---|---|---|---|
| 5,938,764 | A * | 8/1999 | Klein | 713/1 |
| 6,308,265 | B1 * | 10/2001 | Miller | 713/2 |
| 6,385,721 | B1 * | 5/2002 | Puckette | 713/2 |
| 2003/0005277 | A1 * | 1/2003 | Harding et al. | 713/2 |
| 2003/0065915 | A1 | 4/2003 | Yu et al. | |
| 2003/0070035 | A1 | 4/2003 | Wang | |
| 2004/0236936 | A1 | 11/2004 | Bulusu et al. | |
| 2006/0224874 | A1 | 10/2006 | Lu et al. | |

FOREIGN PATENT DOCUMENTS

| | | |
|---|---|---|
| CN | 1629806 | 6/2005 |
| CN | 1967479 | 5/2007 |
| JP | 2000-235483 | 8/2000 |

OTHER PUBLICATIONS

International-Style Search Report and Official Action from a counterpart Macao application; dated Mar. 5, 2010.
Extended European Search Report, Application No. 08011446.5, mailed Jun. 23, 2009.

* cited by examiner

*Primary Examiner* — Thuan Du
(74) *Attorney, Agent, or Firm* — NDQ&M Watchstone LLP

(57) ABSTRACT

An information processing unit is provided, which includes a first memory, a second memory, and a controller. The first memory stores a BIOS program beforehand that is executed at a startup of the unit so as to allow peripheral devices to operate normally. The first memory also stores initial BIOS data beforehand. The second memory stores BIOS data with which the BIOS program is executed. The controller is configured to: (a) if the initial BIOS data is updated, read the updated BIOS data including updated data from the first memory and writes the updated BIOS data into the second memory; and (b) execute the BIOS program using the updated BIOS data written in the second memory.

4 Claims, 6 Drawing Sheets

INFORMATION PROCESSING UNIT FOR AUTOMATICALLY COPYING SYSTEM INFORMATION

This application is based on and claims the benefit of priority from Japanese Patent Application No. 2007-167900, filed on 26 Jun. 2007, the content of which is incorporated herein by reference.

BACKGROUND OF THE INVENTION

1. Field of the Invention

The present invention relates to an information processing unit for automatically copying system information.

2. Related Art

A conventional information processing unit is disclosed in Japanese Patent Laid-Open Publication No. 2000-235483. The unit copies updated system information from one memory to another memory where a BIOS program is stored so as to safely retain the updated system information according to a predetermined input operation, and copies to recover the updated system information from the another memory when necessary. In other words, according to the abovementioned information processing unit, even if the updated system information stored in the one memory is lost, the information processing unit does not require repeating a complicated operation for changing settings of the system information retrospective to initial values, thereby improving convenience.

However, since the information processing unit disclosed in the document No. 2000-235483 requires the predetermined input operation when copying the updated system information, a user may find the input operation cumbersome.

SUMMARY OF THE INVENTION

The present invention provides an information processing unit which does not require an input operation when copying updated system information and can use the updated system information without a complicated operation.

In an aspect of the present invention, an information processing unit is provided, which includes a first memory, a second memory, and a controller. The first memory stores a BIOS program beforehand that is executed at a startup of the unit so as to allow peripheral devices to operate normally. The first memory also stores initial BIOS data beforehand. The second memory stores BIOS data with which the BIOS program is executed. The controller is configured to: (a) if the initial BIOS data is updated, read the updated BIOS data including updated data from the first memory and writes the updated BIOS data into the second memory; and (b) execute the BIOS program using the updated BIOS data written in the second memory.

The information processing unit described above does not require an operation from a user while copying of the updated BIOS data including the updated data is performed for a case where the initial BIOS data stored beforehand in the first memory is updated. The information processing unit allows for copying of the updated information without a complicated operation.

In another aspect of the present invention, an information processing unit is provided, in which the first memory includes an update area and an initial area. The update area stores the updated BIOS data including the updated data, and the initial area stores the initial BIOS data. When the initial BIOS data is updated in (a), the controller reads the updated BIOS data from the update area and writes the updated BIOS data into the second memory, and when the initial BIOS data is not updated in (a), the controller reads the initial BIOS data from the initial area and writes the initial BIOS data into the second memory.

With the information processing unit described above, it is possible to write the BIOS data into the second memory regardless of whether or not a portion of the BIOS data is updated. This allows the appropriate BIOS data to be copied to the second memory.

According to the present invention, the information processing unit does not require an input operation when copying the updated system information, and thus can use the updated system information without complicated operation.

DETAILED-DESCRIPTION OF THE INVENTION

Embodiments of the present invention are described below. It should be noted that the same reference symbol is used for identical elements and repetitive descriptions are omitted.

An information processing unit 1 according to the present invention includes a BIOSROM 27 and a CMOSRAM 25. The BIOSROM 27 stores a BIOS program executed upon start-up, which properly operates peripheral devices. The CMOSRAM 25 stores BIOS data that the BIOS program uses during operation. When the BIOS data previously stored in the BIOSROM 27 is updated, a main CPU 21 reads the BIOS data, which includes updated data, from the BIOSROM 27, writes the BIOS data into the CMOSRAM 25, and then executes the BIOS program according to the written BIOS data.

Figure 1:
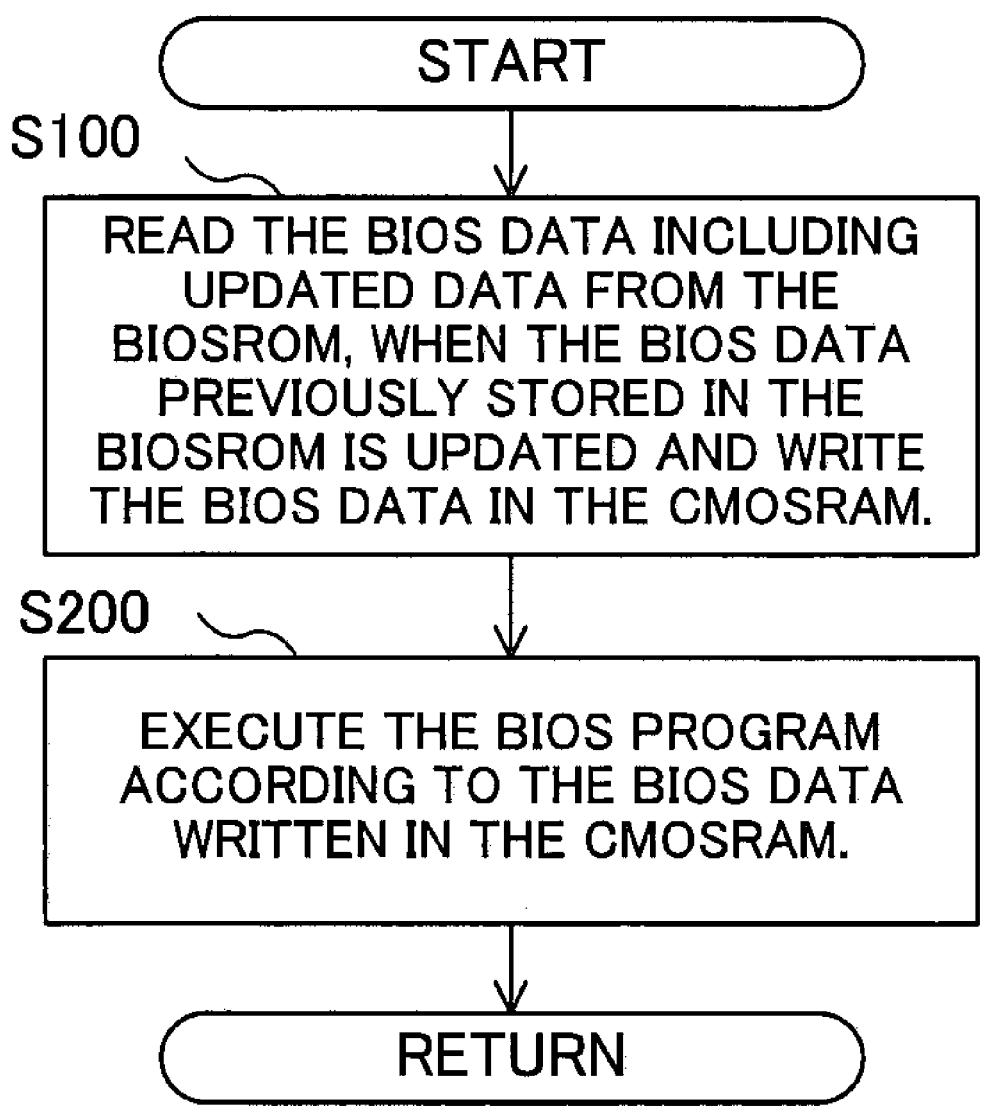
FIG. 1 is a flowchart showing the flow of a processing which is executed by an information processing unit according to an embodiment of the present invention.

Although the details are described later, as shown in FIG. 1, the main CPU 21 reads the BIOS data from the BIOSROM 27, and writes the BIOS data into the CMOSRAM 25 (Step S100). Subsequently, the main CPU 21 executes the BIOS program according to the BIOS data written in the CMOSRAM 25 (Step S200).

Overall Configuration of Slot Machine

Figure 2:
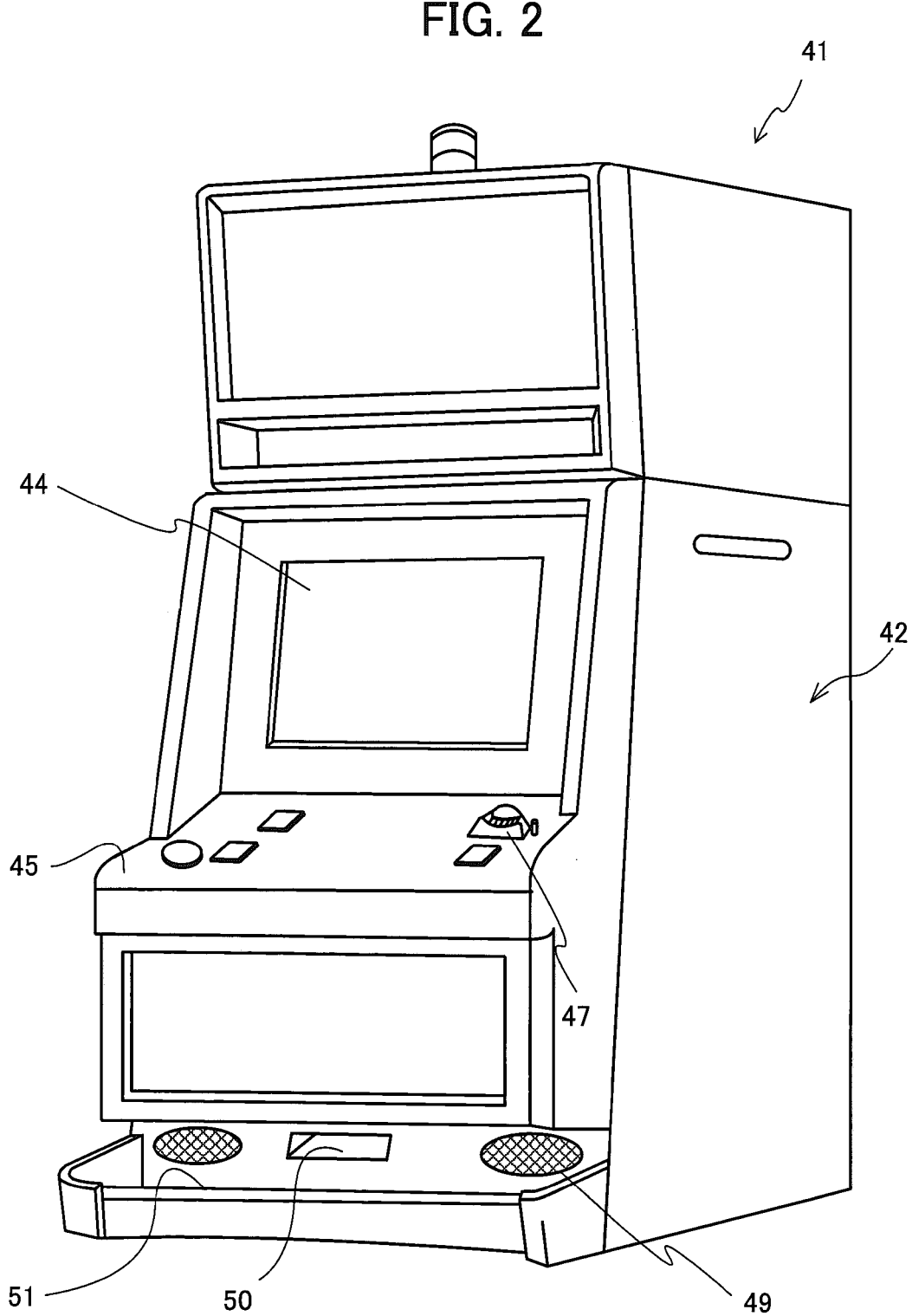
FIG. 2 is a perspective view showing an overall configuration of a slot machine according to an embodiment of the present invention.

FIG. 2 is a perspective view showing an overall configuration of a slot machine 41 according to an embodiment of the present invention. The slot machine 41 includes the information processing unit 1, which is described later.

The slot machine 41 includes a display device for displaying an image for a game. An image of a plurality of reels (five reels) arranged in parallel having a plurality of symbols thereon is shown on the display device, and a variable display image (reel image) is displayed as if the reels were scrolling. The slot machine 41 is configured so as to be a video slot machine enabling a game in which an award is determined corresponding to a combination of stationary symbols on each reel displayed on the display device (a reel depicted by an image is called "a virtual reel").

The slot machine 41 includes a housing 42 and an image display panel 44 on the front side of the housing 42. The image display panel 44 includes a liquid crystal display device (not shown) to display game images including reel images.

Furthermore, the slot machine 41 includes a control panel 45, which has a plurality of operation buttons for a player to operate predetermined operations, below the image display panel 44, and a coin insertion portion 47 for inserting a game medium used in a game such as medals and coins (refer to as "coin" hereinafter) on the right side of the control panel 45. The coin insertion portion 47 includes a coin sensor 47a (see FIG. 3) that outputs a signal indicating the insertion of coins. In addition, the slot machine 41 includes a coin payout opening 50 and a coin receiving portion 51 at a bottom portion of the housing 42, and speakers 49L and 49R are provided on left and right sides of the payout opening 50, respectively.

Figure 3:
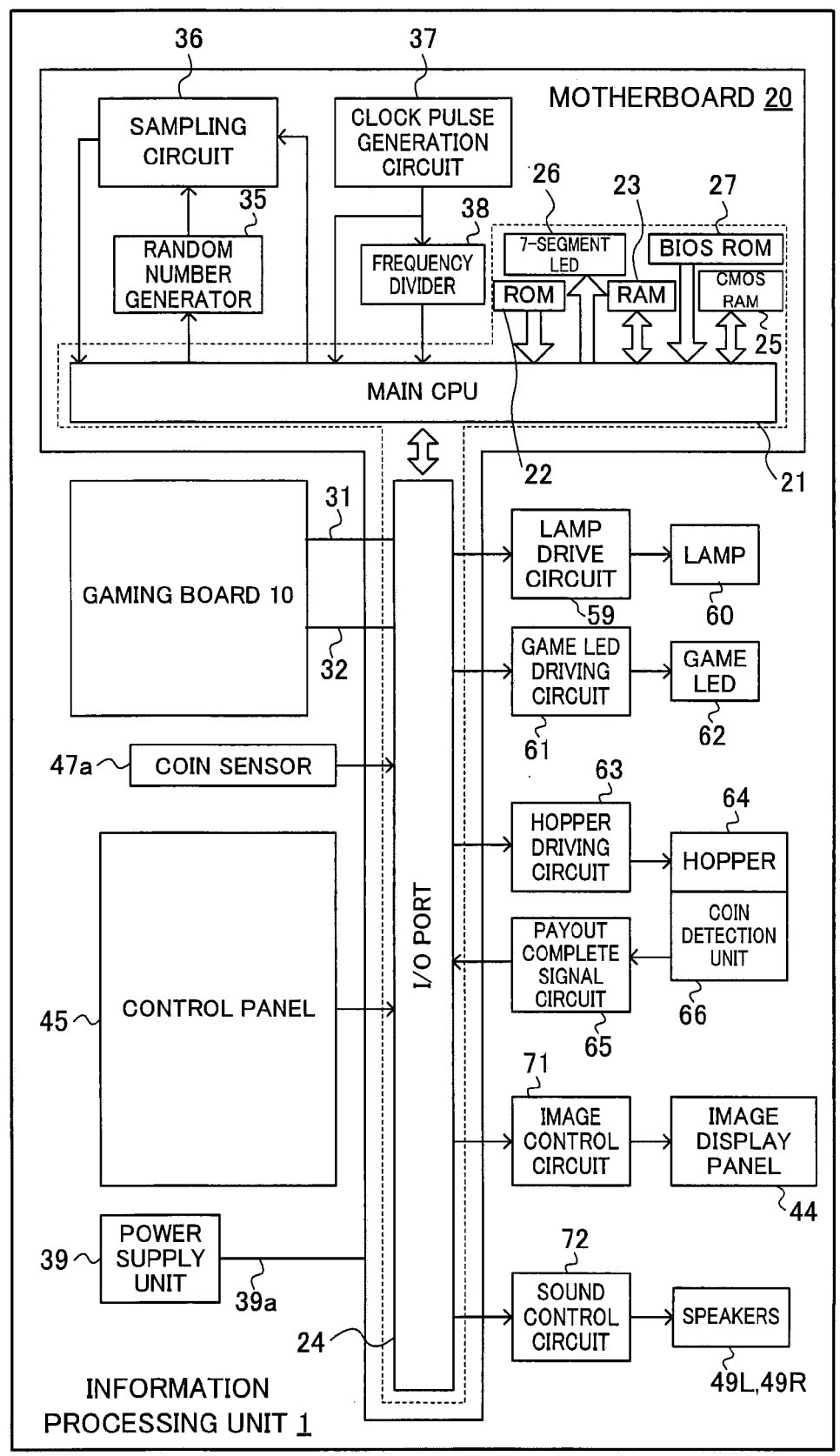
FIG. 3 is a block diagram showing an overall configuration of an information processing unit according to an embodiment of the present invention.

FIG. 3 is a block diagram showing the information processing unit 1 according to the embodiment of the present invention. The information processing unit 1 includes a motherboard 20, a gaming board 10 and a plurality of other components which perform the game actions.

The motherboard 20 is configured by using a general purpose motherboard commercially available (a printed circuit board mounted with basic components of a personal computer), and includes a main CPU 21, ROM 22, RAM 23, CMOSRAM 25, BIOSROM 27 and an I/O port 24 to which a PCI bus 31 and an IDE bus 32 are connected. The main CPU 21 provided on the motherboard 20 executes the BIOS program, which is described later, stored in the BIOSROM 27, and initializes the peripheral devices including the gaming board 10, when a power supply switch of a power supply unit (not shown) connected to the motherboard 20 is turned on. Upon electric power being supplied to the motherboard 20 from the power supply unit, the main CPU 21 starts up and the electric power is supplied to the gaming board 10 via the PCI bus 31.

The ROM 22 stores permanent data. The ROM 22 is formed of a memory device such as a flash memory, for which both rewritable memory and non-rewritable memory may be used. The RAM 23 stores data and programs used for operating the main CPU 21.

The BIOSROM 27 stores beforehand the BIOS program and the BIOS data used by the BIOS program. A memory device such as a rewritable flash memory may be adopted for the BIOSROM 27.

The CMOSRAM 25 stores the BIOS data for the BIOS program. The CPU 21 reads the BIOS data from BIOSROM 27 and stores it in the CMOSRAM 25. The CMOSRAM 25 is a memory device that loses recorded contents if the power supply is interrupted. In order to maintain the contents, it is required to connect a battery (not shown) which is durable for many hours, thereby supplying power to the memory device irrespective of whether the power supply switch of a personal computer is on or off.

The motherboard 20 including the abovementioned main CPU 21, ROM 22, RAM 23, I/O port 24, CMOSRAM 25 and BIOSROM 27, further includes a seven-segment LED 26, a random number generator 35, a sampling circuit 36, a clock pulse generation circuit 37 and a frequency divider 38. A power supply unit 39 is connected to the motherboard 20 by a power supply cable 39a. Furthermore, the seven-segment LED 26, displays a predetermined code (number), receiving a signal from the main CPU 21. The random number generator 35 generates a predetermined range of random numbers in response to a command from the CPU 21. In response to a command of the CPU 21, the sampling circuit 36 extracts an arbitrary random number among the random numbers generated by the random number generator 35, and inputs the extracted random number to the CPU 21. The clock pulse generation circuit 37 generates a reference clock for operating the main CPU 21. The frequency divider 38 inputs a signal indicating the reference clock divided by a predetermined period to the main CPU 21.

Furthermore, the information processing unit 1 includes a lamp driving circuit 59, a lamp 60, a game LED driving circuit 61, a game LED 62, a hopper driving circuit 63, a hopper 64, a payout complete signal circuit 65, a coin detection unit 66, an image control circuit 71, and a sound control circuit 72 as game operating units. The abovementioned components configure the game operating unit group.

The lamp driving circuit 59 outputs a lamp lighting signal to the lamp 60 to blink the lamp 60 while the game is proceeding. The blinking of the lamp 60 produces visual effects for a game. The game LED driving circuit 61 controls a blinking display of the game LED 62. The game LED 62 displays the amount of credits remaining, the amount of credits awarded, and the like. The hopper driving circuit 63 drives the hopper 64 under the control of the main CPU 21, and the hopper 64 performs an operation for coin payment, and pays out the coins through the payout opening 50 to the coin receiving portion 51. The coin detection unit 66 calculates the amount of coins paid out by the hopper 64, and outputs the numerical value data thus calculated to the a payout complete signal circuit 65. The payout completion signal circuit 65 inputs the numerical value data of coins output from the coin detection unit 66, and then transmits a payout completion signal to the main CPU 21 when the numerical value data has reached the predetermined amount.

The image control circuit 71 controls image display on the image display panel 44 and displays a variable display image of a plurality of symbols and the like.

The sound control circuit 72 inputs an audio signal output from a sound source IC, amplifies the audio signal thus input, and outputs the audio sound from the speakers 49L and 49R. Thus, the audio sound to make the game more exciting is output at appropriate timing from the speakers 49L and 49R, for example, just after the game has started.

Furthermore, the image control circuit 71 and the sound control circuit 72 may be mounted onto the motherboard 20 if an image control program and a sound control program are stored in ROM 22 and the main CPU 21 executes processing according to the programs. In addition, it should be noted that, although the power supply unit 39 is connected to other components than the motherboard 20, connections between the other components and the power supply unit 39 are not shown in FIG. 3 for convenience of reference.

Configuration of BIOSROM Memory Area

Figure 4:
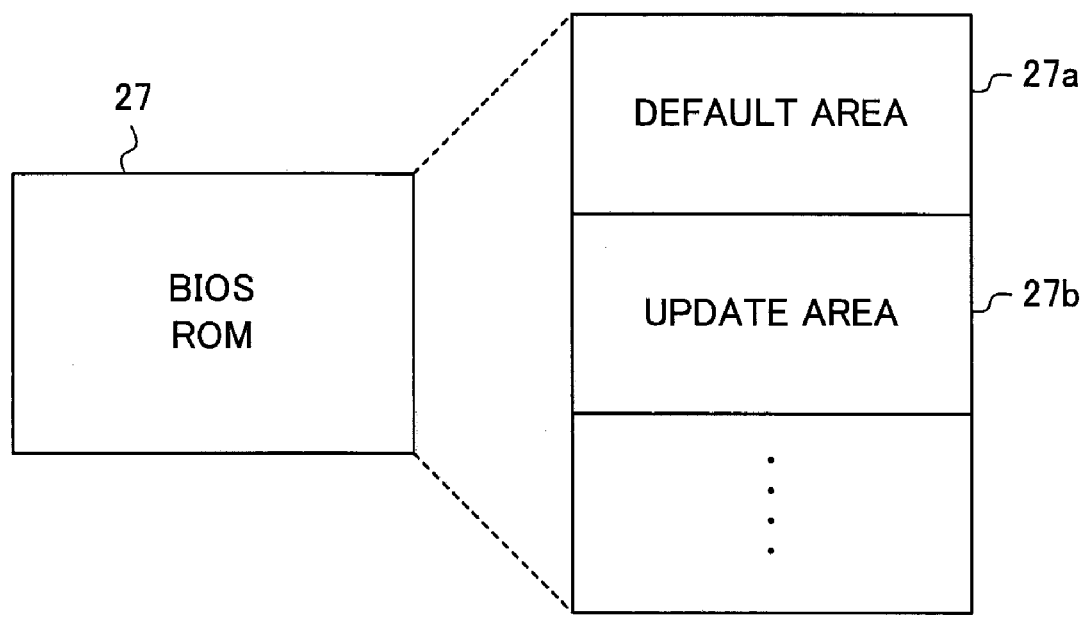
FIG. 4 is a diagram showing a configuration of a memory area of a BIOSROM 27 according to an embodiment of the present invention.
Figure 5:
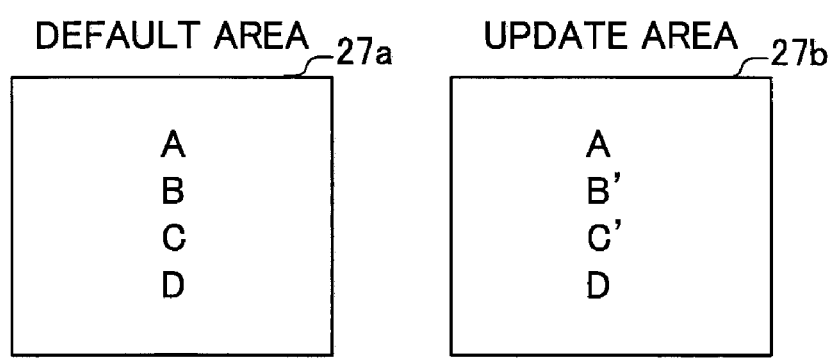
FIG. 5 is a diagram showing a default area 27a and an update area 27b in a BIOSROM 27 according to an embodiment of the present invention.

Next, the configuration of a memory area of the BIOSROM 27 is described referring to FIGS. 4 and 5. FIG. 4 is a diagram showing the configuration of a memory area of the BIOSROM 27. FIG. 5 is a diagram showing a default area 27a and an update area 27b of the BIOSROM 27.

Referring to FIG. 4, the BIOSROM 27 includes the default area 27a and the update area 27b. The default area 27a stores default-set BIOS data and the update area 27b stores updated BIOS data. The BIOS data stored in the update area 27b includes the entire updated BIOS data, as described later referring to FIG. 5.

Next, referring to FIG. 5, the construction of the default area 27a and the update area 27b are described. The default area 27a stores the default-set BIOS data (for example, A, B, C and D), which is not changed.

On the other hand, the update area 27b stores the updated BIOS data (for example, A, B', C' and D), where A and D have no changes, but B and C are updated to B' and C'.

Flow of BIOS Program Processing

Figure 6:
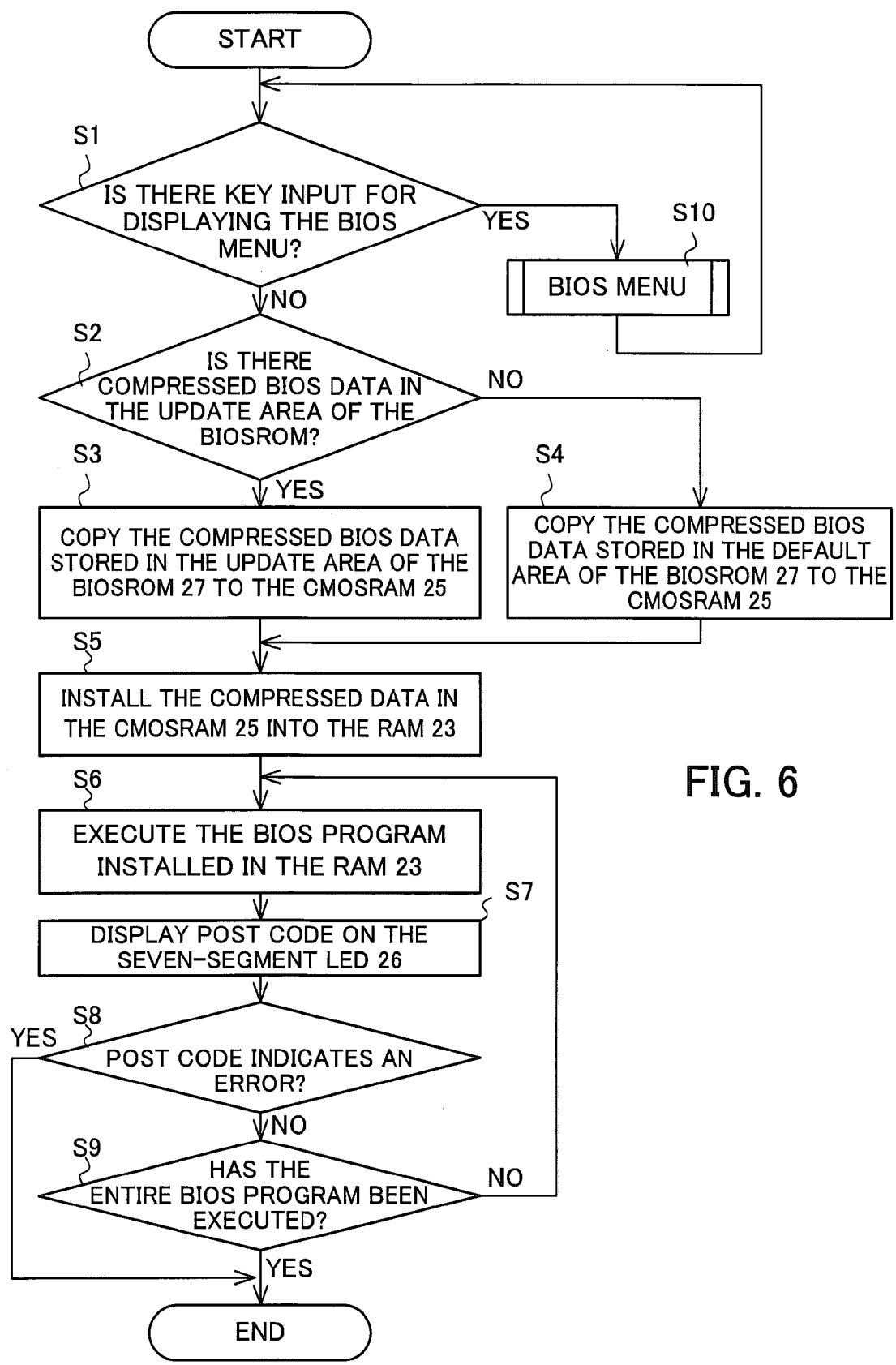
FIG. 6 is a flowchart showing processing for executing a BIOS program according to an embodiment of the present invention.
Figure 7:
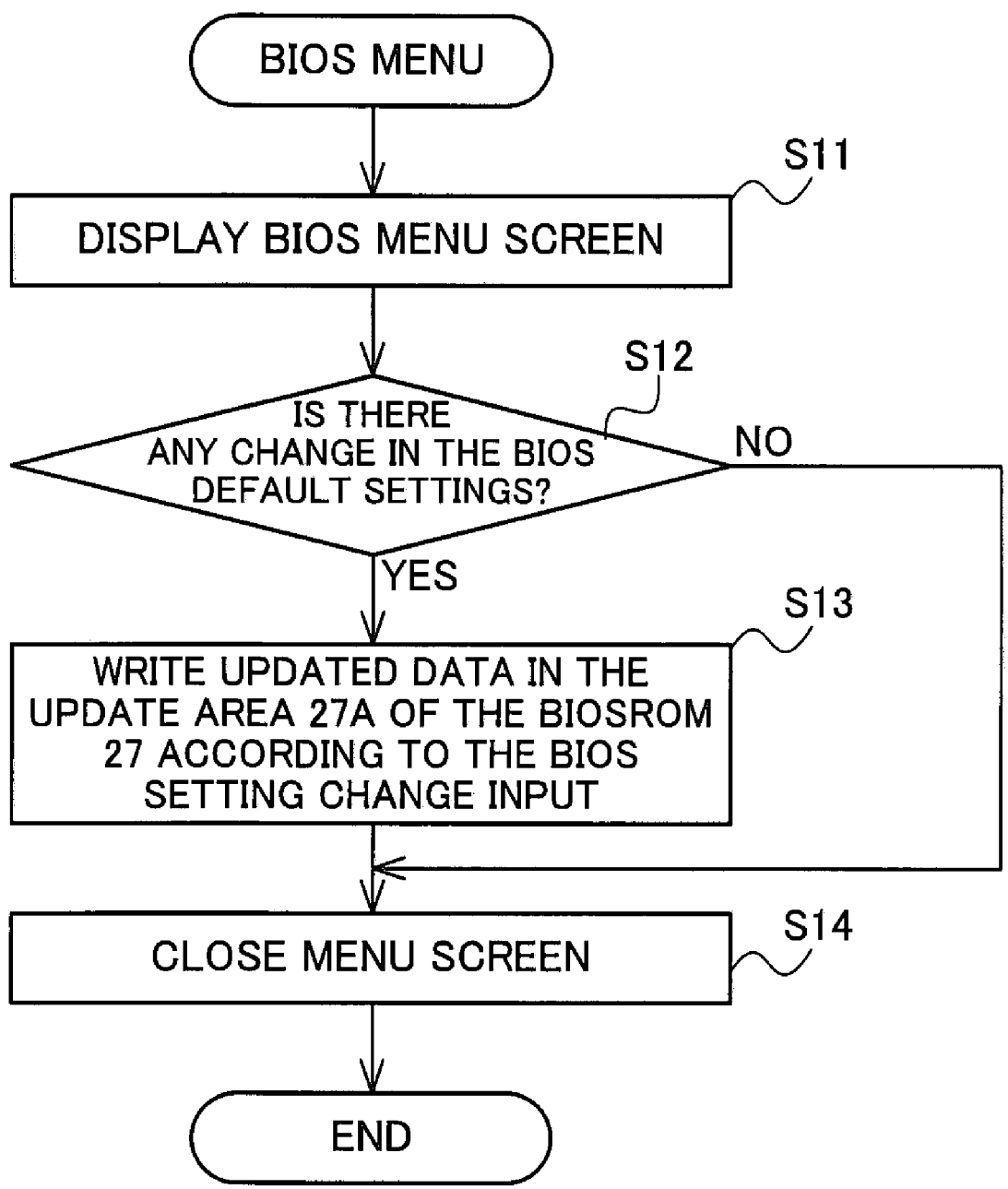
FIG. 7 is a flowchart showing the processing for executing the BIOS program according to the embodiment of the present invention.

A flow of the BIOS program processing is described while referring to FIGS. 6 and 7.

In FIG. 6, the main CPU 21 determines whether or not there is a key input for displaying a BIOS menu (Step S1). In a case where the determination is YES, the main CPU 21 moves the processing to Step S10, and in a case where the determination is NO, the main CPU 21 moves the processing to Step S2. In Step S2, the main CPU 21 determines whether or not there is compressed BIOS data in the update area 27b of the BIOSROM 27. In a case where the determination is YES, the main CPU 21 moves the processing to Step S3, and in a case where the determination is NO, the main CPU 21 moves the processing to Step S4.

In Step S3, the main CPU 21 copies the compressed BIOS data stored in the update area 27b of the BIOSROM 27 to the CMOSRAM 25, and moves the processing to Step S5. In Step S4, the main CPU 21 copies compressed BIOS data stored in the default area 27a of the BIOSROM 27 to the CROMRAM 25, and moves the processing to Step S5.

By the processing in Steps S3 and S4, the updated BIOS data is written into the CMOSRAM 25 in a case where a portion of the BIOS data stored in the BIOSROM 27 is updated, and the default BIOS data is written into the CMOSRAM 25 in a case where the BIOS data stored in the BIOSROM 27 is not updated, whereby the main CPU 21 can consistently copy the most appropriate BIOS data.

Furthermore, since copying of the BIOS data does not require an operation from a user, the main CPU 21 can consistently copy the most appropriate BIOS data, relieving the user of complicated operation.

In Step S5, the main CPU 21 installs the compressed data stored in the CMOSRAM 25 into the RAM 23, and moves the processing to Step S6. In Step S6, the main CPU 21 executes the BIOS program installed in the RAM 23, and then moves the processing to Step S7. In Step S7, the main CPU 21 displays POST (Power On Self Test) code on the seven-segment LED 26.

Here, the POST code is a numerical number indicating a diagnostic result, which is based on a diagnosis with the BIOS program to check whether there is an error in hardware such as peripheral devices. In the present embodiment, the POST code is displayed on the seven-segment LED 26, whereby an error condition can be recognized easily.

In Step S8, the main CPU 21 determines whether or not the POST code indicates an error. If the determination is YES, the CPU 21 terminates the routine. If the determination is NO, the main CPU 21 moves the processing to Step S9. In Step S9, the main CPU 21 determines whether or not the entire BIOS program has been executed. If the determination is YES, the main CPU 21 terminates the routine. If the determination is NO, the main CPU 21 moves the processing to Step S6.

Referring to FIG. 7, the main CPU 21 causes a display of the BIOS menu screen (Step S11). In Step S12, the main CPU 21 determines whether or not there is any change in the BIOS setting. If the determination is YES, the CPU 21 moves the processing to Step S13. If the determination is NO, then the CPU 21 moves the processing to Step S14.

The main CPU 21 determines whether or not there is any change in the BIOS setting by determining whether or not there is data for changing the setting in a predetermined area of the BIOSROM 27.

In Step S13, upon receiving input to change the BIOS setting, the main CPU 21 writes updated data into the update area 27a of the BIOSROM 27, and moves the processing to Step S14. In Step S14, the main CPU 21 closes the BIOS menu screen and moves the processing to Step S1 in FIG. 6.

Meanwhile, although each of the abovementioned embodiments is described referring to a slot machine 41, which performs a slot game as an example, the present invention can be applied to a gaming machine that performs other games. Specifically, the gaming machine to which the present invention can be applied includes a card game machine for playing a card game by displaying card images representing trump cards, a mah-jongg game machine for playing a mah-jongg game, and a pachinko gaming machine which uses gaming balls. Furthermore, in a case of a slot machine, the slot machine is not limited to a slot machine such as a video slot machine 41, but the present invention can be applied to a slot machine having a mechanical reel. In this case, the mechanical reels configure the game operating units according to the present invention.

What is claimed is:

1. An information processing unit comprising:
    a first memory that stores a BIOS program beforehand that is executed at a startup of the unit so as to allow peripheral devices to operate normally, the first memory storing initial BIOS data beforehand;
    a second memory storing BIOS data with which the BIOS program is executed; and
    a controller configured to:
        (a) if the initial BIOS data is updated, read updated BIOS data including data with no changes and updated data that is changed from the first memory and write the updated BIOS data into the second memory;
        (b) if the initial BIOS data is not updated, read the initial BIOS data that is not changed from the first memory and write the initial BIOS data into the second memory; and
        (c) execute the BIOS program using one of the updated BIOS data and the initial BIOS data written in the second memory.

2. The information processing unit according to claim 1, wherein
    the first memory includes an update area and an initial area, the update area storing the updated BIOS and the initial area storing the initial BIOS data,
    the controller is configured to read the updated BIOS data from the update area in step (a), and
    the controller is configured to read the initial BIOS data from the initial area in step (b).

3. An information processing unit comprising:
    a first memory that stores a BIOS program beforehand that is executed at a startup of the unit so as to allow peripheral devices to operate normally, the first memory storing initial BIOS data beforehand;
    a second memory storing BIOS data with which the BIOS program is executed; and
    a controller configured to:
        (a) determine whether the BIOS data is updated
        (b) if the initial BIOS data is updated, read updated BIOS data including data with no changes and updated data that is changed from the first memory and write the updated BIOS data into the second memory;

(c) if the initial BIOS data is not updated, read the initial BIOS data that is not changed from the first memory and write the initial BIOS data into the second memory; and (d) execute the BIOS program using one of the updated BIOS data and the initial BIOS data written in the second memory.

4. The information processing unit according to claim 3, wherein the first memory includes an update area and an initial area, the update area storing the updated BIOS data and the initial area storing the initial BIOS data, the controller is configured to read the updated BIOS data from the update area in step (b), and the controller is configured to read the initial BIOS data from the initial area in step (c).

* * * * *